(12) United States Patent
Baxter, Jr. et al.

(10) Patent No.: US 7,498,396 B2
(45) Date of Patent: *Mar. 3, 2009

(54) MID-RANGE VINYLIDENE CONTENT POLYISOBUTYLENE POLYMER PRODUCT PRODUCED BY LIQUID PHASE POLYMERIZATION PROCESS

(75) Inventors: C. Edward Baxter, Jr., League City, TX (US); Gilbert Valdez, Pearland, TX (US); Christopher Lobue, Montgomery, TX (US); Timothy Lowry, Spring, TX (US); Armen Abazajian, Houston, TX (US)

(73) Assignee: Texas Petrochemicals LP, Houston, TX (US)

( * ) Notice: Subject to any disclaimer, the term of this patent is extended or adjusted under 35 U.S.C. 154(b) by 347 days.

This patent is subject to a terminal disclaimer.

(21) Appl. No.: 11/281,746

(22) Filed: Nov. 17, 2005

(65) Prior Publication Data

US 2006/0079652 A1 Apr. 13, 2006

Related U.S. Application Data

(63) Continuation of application No. 10/968,630, filed on Oct. 19, 2004, now Pat. No. 7,056,990, which is a continuation of application No. 10/208,234, filed on Jul. 30, 2002, now Pat. No. 6,884,858, and a continuation of application No. 10/102,279, filed on Mar. 19, 2002, now Pat. No. 7,037,999, application No. 10/208,234, filed on Jul. 30, 2002, now Pat. No. 6,884,858, which is a continuation of application No. 09/665,084, filed on Sep. 20, 2000, now Pat. No. 6,525,149, which is a continuation-in-part of application No. 09/515,790, filed on Feb. 29, 2000, now Pat. No. 6,562,913.

(60) Provisional application No. 60/279,305, filed on Mar. 28, 2001, provisional application No. 60/160,357, filed on Sep. 19, 1999.

(51) Int. Cl.
*C08F 110/10* (2006.01)
*C08F 4/14* (2006.01)
*C07C 11/09* (2006.01)

(52) U.S. Cl. ............... 526/348.7; 526/64; 526/237; 585/18

(58) Field of Classification Search ........... 526/348.7, 526/237, 64; 585/10, 18
See application file for complete search history.

(56) References Cited

U.S. PATENT DOCUMENTS

| | | | |
|---|---|---|---|
| 132,264 A | 10/1872 | Earnes et al. | |
| 2,139,038 A | 12/1938 | Russell | |
| 2,379,656 A | 7/1945 | Ruthruff | |
| 2,407,494 A | 9/1946 | Hartvigsen | |
| 2,411,097 A | 11/1946 | Kopp | |
| 2,559,062 A | 7/1951 | Domte | |
| 2,559,984 A | 7/1951 | Montgomery et al. | |
| 2,727,022 A | 12/1955 | Linsk | |
| 2,833,840 A | 5/1958 | Longwell | |
| 2,856,395 A | 10/1958 | Richard, Jr. et al. | |
| 2,889,370 A | 6/1959 | Schechter | |
| 2,918,508 A | 12/1959 | Coopersmith et al. | |
| 3,024,226 A | 3/1962 | Nolan, Jr. | |
| 3,166,546 A | 1/1965 | Nolan, Jr. | |
| 3,284,537 A | 11/1966 | Webb, Jr. | |
| 3,306,907 A | 2/1967 | McNinch | |
| 3,346,354 A | 10/1967 | Kautsky et al. | |
| 3,382,291 A | 5/1968 | Brennan | |
| 3,634,383 A | 1/1972 | Miller, Jr. | |
| 3,726,842 A | 4/1973 | Treischmann et al. | |
| 3,778,487 A | 12/1973 | Driscoll et al. | |
| 3,780,128 A | 12/1973 | Shubkin | |
| 3,849,085 A | 11/1974 | Kreuz et al. | |
| 3,927,041 A | 12/1975 | Cengel et al. | |
| 3,935,249 A | 1/1976 | Puskas et al. | |
| 3,991,129 A | 11/1976 | Daniels | |
| 4,110,521 A | 8/1978 | Barnett et al. | |
| 4,152,499 A | 5/1979 | Boerzel et al. | |
| 4,227,027 A | 10/1980 | Booth et al. | |
| 4,231,759 A | 11/1980 | Udelhofen et al. | |
| 4,238,628 A | 12/1980 | Cahill et al. | |
| 4,383,093 A | 5/1983 | Shiraki et al. | |
| 4,391,959 A | 7/1983 | Fauth et al. | |
| 4,400,493 A | 8/1983 | Abernathy, Jr. et al. | |
| 4,433,197 A | 2/1984 | Vogel et al. | |
| 4,605,808 A | 8/1986 | Samson | |

(Continued)

FOREIGN PATENT DOCUMENTS

CA 2195575 2/1996

(Continued)

Primary Examiner—Fred M Teskin
(74) Attorney, Agent, or Firm—James H. Marsh, Jr.; Stinson Morrison Hecker LLP

(57) ABSTRACT

A mid-range vinylidene content PIB polymer composition made by a liquid phase polymerization process conducted in a loop reactor at a temperature of at least 60° F. using a $BF_3$/methanol catalyst complex and a contact time of no more than 4 minutes. At least about 90% of the PIB molecules present in the product comprise alpha or beta position isomers. The vinylidene (alpha) isomer content of the product may range from 20% to 70% thereof, and the content of tetra-substituted internal double bonds is very low, advantageously no more than about 10%, preferably less than about 5% and ideally less than about 1-2%.

4 Claims, 2 Drawing Sheets

U.S. PATENT DOCUMENTS

| | | | |
|---|---|---|---|
| 4,663,406 A | 5/1987 | Bronstert et al. | |
| 4,691,072 A | 9/1987 | Schick et al. | |
| 4,849,572 A | 7/1989 | Chen et al. | |
| 4,883,847 A | 11/1989 | Leung et al. | |
| 4,914,166 A | 4/1990 | Kennedy et al. | |
| 4,943,616 A | 7/1990 | Mishra et al. | |
| 4,956,512 A | 9/1990 | Nissfolk et al. | |
| 4,973,733 A | 11/1990 | Valkovich et al. | |
| 4,982,042 A | 1/1991 | Akatsu et al. | |
| 5,068,490 A | 11/1991 | Eaton | |
| 5,175,225 A | 12/1992 | Ruhe, Jr. | |
| 5,191,044 A | 3/1993 | Rath et al. | |
| 5,192,335 A | 3/1993 | Cherpeck | |
| 5,254,649 A | 10/1993 | Miln et al. | |
| 5,254,784 A | 10/1993 | Nurminen et al. | |
| 5,286,823 A | 2/1994 | Rath | |
| 5,300,701 A | 4/1994 | Cherpeck | |
| 5,408,018 A | 4/1995 | Rath | |
| 5,439,991 A | 8/1995 | Colman et al. | |
| 5,448,001 A | 9/1995 | Baird | |
| 5,563,313 A | 10/1996 | Chung et al. | |
| 5,710,225 A | 1/1998 | Johnson et al. | |
| 5,731,379 A | 3/1998 | Kennan et al. | |
| 5,733,993 A | 3/1998 | Yu et al. | |
| 5,767,334 A | 6/1998 | Nissfolk et al. | |
| 5,779,742 A | 7/1998 | Baker | |
| 5,792,729 A | 8/1998 | Harrison et al. | |
| 5,811,616 A | 9/1998 | Holub et al. | |
| 5,814,706 A | 9/1998 | Yu et al. | |
| 5,910,550 A | 6/1999 | Rath | |
| 5,945,575 A * | 8/1999 | Sigwart et al. | 585/531 |
| 5,962,604 A | 10/1999 | Rath | |
| 6,384,154 B1 * | 5/2002 | Sigwart et al. | 526/68 |
| 6,441,110 B1 * | 8/2002 | Sigwart et al. | 526/104 |
| 6,525,149 B1 | 2/2003 | Baxter et al. | |
| 6,562,913 B1 | 5/2003 | Baxter et al. | |
| 6,642,329 B1 | 11/2003 | Rath | |
| 6,683,138 B2 | 1/2004 | Baxter et al. | |
| 6,710,140 B2 | 3/2004 | Wettling et al. | |
| 6,846,903 B2 | 1/2005 | Wettling et al. | |
| 6,884,858 B2 | 4/2005 | Baxter et al. | |
| 7,037,999 B2 * | 5/2006 | Baxter et al. | 526/348.7 |

FOREIGN PATENT DOCUMENTS

| | | |
|---|---|---|
| CA | 2217848 | 12/1996 |
| CA | 2334263 A1 | 12/1999 |
| DE | 27 02 604 | 7/1978 |
| DE | 1592016 | 7/1981 |
| EP | 0 145 235 A1 | 6/1985 |
| EP | 0 279 456 A1 | 8/1988 |
| EP | 0 322 241 A1 | 6/1989 |
| EP | 0 355 997 A1 | 2/1990 |
| EP | 0 400 905 A1 | 12/1990 |
| EP | 0 481 297 A2 | 4/1992 |
| EP | 0 628 575 A1 | 12/1994 |
| EP | 0 671 419 A1 | 9/1995 |
| EP | 0 831 141 A1 | 3/1998 |
| EP | 0 628 022 B1 | 11/1998 |
| GB | 1159368 | 7/1969 |
| WO | WO 93/10063 | 5/1993 |
| WO | WO 94/14739 | 4/1994 |
| WO | WO 99/64482 A1 | 12/1999 |
| WO | WO 00/08075 * | 2/2000 |
| WO | WO 01/19873 | 3/2001 |
| WO | WO 01/27172 A1 | 4/2001 |
| WO | WO 02/06359 A1 | 1/2002 |
| WO | WO 02/14385 A1 | 2/2002 |

* cited by examiner

MID-RANGE VINYLIDENE CONTENT POLYISOBUTYLENE POLYMER PRODUCT PRODUCED BY LIQUID PHASE POLYMERIZATION PROCESS

CROSS REFERENCES TO RELATED APPLICATION

This application is a continuation of application Ser. No. 10/968,630 filed Oct. 19, 2004 (now U. S. Pat. No. 7,056,990) from which priority benefits are claimed pursuant to 35 U.S.C. § 120. application Ser. No. 10/968,630 in turn is a continuation of and claims priority benefits pursuant to 35 U.S.C. § 120 from application Ser. No. 10/102,279 filed Mar. 19, 2002 (now U. S. Pat. No. 7,037,999), which in turn claims priority benefits pursuant to 35 U.S.C. § 119(e) from provisional application Ser. No. 60/279,305 filed Mar. 28, 2001. Said application Ser. No. 10/968,630 also is a continuation of and claims priority benefits pursuant to 35 U.S.C. § 120 from application Ser. No. 10/208,234 filed Jul. 30, 2002 (now U. S. Pat. No. 6,884,858), and which in turn is a continuation of and claims priority pursuant to 35 U.S.C. § 120 from application Ser. No. 09/665,084 filed Sep. 20, 2000 (now U. S. Pat. No. 6,525,149), which again in turn is a continuation-in-part of and claims priority pursuant to 35 U.S.C. § 120 from utility application Ser. No. 09/515,790 filed Feb. 29, 2000 (now U.S. Pat. No. 6,562,913) and which again in turn claims priority benefits pursuant to 35 U.S.C. § 119(e) from provisional application Ser. No. 60/160,357, filed Oct. 19, 1999. The entireties of each of the disclosures of each of said prior applications are hereby specifically incorporated herein by this reference thereto.

BACKGROUND OF THE INVENTION

1. Field of the Invention

The present invention relates to the preparation of polyisobutylene (PIB). In particular the present invention relates to the preparation of a mid-range vinylidene content PIB composition. In this regard, the invention provides a novel liquid phase process for the polymerization of isobutylene to prepare a mid-range vinylidene content PIB composition using a modified $BF_3$ catalyst. The invention also provides a novel composition of matter comprising a mid-range vinylidene content PIB composition.

2. The Prior Art Background

The polymerization of isobutylene using Friedel-Crafts type catalysts, including $BF_3$, is a generally known procedure which is disclosed, for example, in "HIGH POLYMERS", Vol. XXIV (J. Wiley & Sons, Inc., New York, 1971), pp. 713 ff. The degree of polymerization of the products obtained varies according to which of a number of known polymerization techniques is used. In this latter connection, it is to be understood that, in general, the molecular weight of the polymeric product is directly related to the degree of polymerization.

It is also known that PIB may be manufactured in at least two different major grades—i.e., regular and high vinylidene. Conventionally, these two product grades have been made by different processes, but both often and commonly use a diluted isobutylene feedstock in which the isobutylene concentration may range from 40-60% by weight. More recently it has been noted that at least the high vinylidene PIB may be produced using a concentrated feedstock having an isobutylene content of 90% by weight or more. Non-reactive hydrocarbons, such as isobutane, n-butane and/or other lower alkanes commonly present in petroleum fractions, may also be included in the feedstock as diluents. The feedstock often may also contain small quantities of other unsaturated hydrocarbons such as 1-butene and 2-butene.

Regular grade PIB may range in molecular weight from 500 to 1,000,000 or higher, and is generally prepared in a batch process at low temperature, sometimes as low as −50 to −70 EC. $AlCl_3$, $RAlCl_2$ or $R_2AlCl$ are used as catalysts. The catalyst is generally not totally removed from the final PIB product due to processing peculiarities. Molecular weight may be controlled by temperature since the molecular weight of the product varies inversely with temperature. That is to say, higher temperatures give lower molecular weights. Reaction times are often in the order of hours. The desired polymeric product has a single double bond per molecule, and the double bonds are mostly internal. Generally speaking, at least about 90% of the double bonds are internal and less than 10% of the double bonds are in a terminal position. Even though the formation of terminal double bonds is believed to be kinetically favored, the long reaction times and the fact that the catalyst is not totally removed, both favor the rearrangement of the molecule so that the more thermodynamically favored internal double bond isomers are formed. Regular PIB may be used as a viscosity modifier, particularly in lube oils, as a thickener, and as a tackifier for plastic films and adhesives. PIB can also be functionalized to produce intermediates for the manufacture of detergents and dispersants for fuels and lube oils.

High vinylidene PIB, a relatively new product in the marketplace, is characterized by a large percentage of terminal double bonds, typically greater than 70% and preferentially greater than 80%. This provides a much more reactive product, compared to regular PIB, and hence this product is also referred to as highly reactive PIB. The terms highly reactive (HR-PIB) and high vinylidene (HV-PIB) are synonymous. The basic processes for producing HV-PIB all include a reactor system, employing $BF_3$ and/or modified $BF_3$ catalysts, such that the reaction time can be closely controlled and the catalyst can be immediately neutralized once the desired product has been formed. Since formation of the terminal double is kinetically favored, short reactions times favor high vinylidene levels. The reaction is quenched, usually with an aqueous base solution, such as, for example, $NH_4OH$, before significant isomerization to internal double bonds can take place. Molecular weights are relatively low. As used in this application, the terminology "relatively low" refers to a number average molecular weight ($M_N$) which is less than about 10,000. HV-PIB having an $M_N$ of about 950-1050 is the most common product. Conversions, based on isobutylene, are kept at 75-85%, since attempting to drive the reaction to higher conversions reduces the vinylidene content through isomerization. Prior U.S. Pat. No. 4,152,499 dated May 1, 1979, U.S. Pat. No. 4,605,808 dated Aug. 12, 1986, U.S. Pat. No. 5,068,490 dated Nov. 26, 1991, U.S. Pat. No. 5,191,044 dated Mar. 2, 1993, U.S. Pat. No. 5,286,823 dated Jun. 22, 1992, U.S. Pat. No. 5,408,018 dated Apr. 18, 1995 and U.S. Pat. No. 5,962,604 dated Oct. 5, 1999 are directed to related subject matter.

U.S. Pat. No. 4,152,499 describes a process for the preparation of PIBs from isobutylene under a blanket of gaseous $BF_3$ acting as a polymerization catalyst. The process results in the production of a PIB wherein 60 to 90% of the double bonds are in a terminal (vinylidene) position.

U.S. Pat. No. 4,605,808 discloses a process for preparing PIB wherein a catalyst consisting of a complex of $BF_3$ and an alcohol is employed. It is suggested that the use of such a catalyst complex enables more effective control of the reaction parameters. Reaction contact times of at least 8 minutes are required to obtain a PIB product wherein at least about 70% of the double bonds are in a terminal position.

U.S. Pat. No. 5,191,044 discloses a PIB production process requiring careful pretreatment of a $BF_3$/alcohol complex to insure that all free $BF_3$ is absent from the reactor. The complex must contain a surplus of the alcohol complexing agent in order to obtain a product wherein at least about 70% of the double bonds are in a terminal position. The only reaction time exemplified is 10 minutes, and the reaction is carried out at temperatures below 0 EC.

In addition to close control of reaction time, the key to obtaining high vinylidene levels seems to be control of catalyst reactivity. This has been done in the past by complexing $BF_3$ with various oxygenates including sec-butanol and MTBE. One theory is that these complexes are actually less reactive than $BF_3$ itself, disproportionately slowing the isomerization reaction and thus allowing for greater differentiation between the vinylidene forming reaction (polymerization) and the isomerization reaction rates. Mechanisms have also been proposed that suggest the $BF_3$ complexes are non-protonated and thus are not capable of isomerizing the terminal double bond. This further suggests that water (which can preferentially protonate $BF_3$) must generally be excluded from these reaction systems. In fact, prior publications describing preparation of PIB using $BF_3$ complexes teach low water feed (less than 20 ppm) is critical to formation of the high vinylidene product.

HV-PIB is increasingly replacing regular grade PIB for the manufacture of intermediates, not only because of higher reactivity, but also because of developing requirements for "chloride free" materials in the final product applications. Important PIB derivatives are PIB amines, PIB alkylates and PIB maleic anhydride adducts.

PIB amines can be produced using a variety of procedures involving different PIB intermediates which provide a reactive site for subsequent amination. These intermediates may include, for example, epoxides, halides, maleic anhydride adducts, and carbonyl derivatives.

Reference to HV-PIB as "highly reactive" is relative to regular grade PIB. HV-PIB is still not, in absolute terms, highly reactive toward formation of some of these intermediates. Other classes of compounds, polyethers for example, can be much more reactive in the formation of amines and amine intermediates. Amines derived from polyethers are known as polyether amines (PEA=s) and are competitive products to PIB amines.

The use of HV-PIB as an alklylating agent for phenolic compounds, is triggered by the higher reactivity and higher yields achievable with HV-PIB. These very long chain alkyl phenols are good hydrophobes for surfactants and similar products.

The largest volume PIB derivatives are the PIB-maleic anhydride reaction products. HV-PIB is reacted with maleic anhydride through the double bond giving a product with anhydride functionality. This functionality provides reactivity for the formation of amides and other carboxylate derivatives. These products are the basis for most of the lube oil detergents and dispersants manufactured today. As mentioned above, PIB-maleic anhydride products can also be used as intermediates in the manufacture of PIB amine fuel additives.

More recently, a novel more valuable process for the efficient and economical production of HV-PIB has been developed. This new process is described in U.S. Pat. No. 6,562,913 (hereinafter "the '913 patent"), which issued on May, 13, 2003 and is commonly owned with the present application. The entirety of the disclosure of the '913 patent is hereby incorporated into the present application by this specific reference thereto.

The '913 patent relates to a HV-PIB production process wherein the polymerization reaction takes place at higher temperatures and at lower reaction times than had previously been thought possible. In particular, the '913 patent describes a liquid phase polymerization process for preparing low molecular weight, highly reactive polyisobutylene. Generally speaking, the process of the '913 patent may involve cationic polymerization. However, under some conditions the polymerization reaction may be covalent. Particularly the latter may be true when ether is used as a complexing agent. In accordance with the disclosure of the '913 patent, the process includes the provision of a feedstock comprising isobutylene and a catalyst composition comprising a complex of $BF_3$ and a complexing agent. The feedstock and the catalyst composition are introduced either separately or as a single mixed stream into a residual reaction mixture in a reaction zone. The residual reaction mixture, the feedstock and the catalyst composition are then intimately intermixed to present an intimately intermixed reaction admixture in the reaction zone. The reaction admixture is maintained in its intimately intermixed condition and kept at a temperature of at least about 0 EC. while the same is in said reaction zone, whereby the isobutylene in the reaction admixture is caused to undergo polymerization to form a polyisobutylene product. A product stream comprising a low molecular weight, highly reactive polyisobutylene is then withdrawn from the reaction zone. The introduction of the feedstock into said reaction zone and the withdrawal of the product stream from the reaction zone are controlled such that the residence time of the isobutylene undergoing polymerization in the reaction zone is no greater than about 4 minutes. In accordance with the '913 patent, it is possible to conduct the reaction so that the residence time is no greater than about 3 minutes, no greater than about 2 minutes, no greater than about 1 minute, and ideally, even less than 1 minute.

In accordance with the concepts and principles disclosed in the '913 patent, the process may be conducted in a manner such that the polyisobutylene thus produced has an $M_N$ in the range of from about 350 to about 5000, in the range of from about 600 to about 4000, in the range of from about 700 to about 3000, in the range of from about 800 to about 2000, and ideally in the range of from about 950 to about 1050. Moreover, it is possible to so control the process that a particular $M_N$, such as for example, an $M_N$ of about 1000, may be achieved.

The '913 patent thus discloses a process which may be controlled sufficiently to insure the production of a polyisobutylene product having a vinylidene content of at least about 70%. More preferably the PIB product may have a vinylidene content of at least about 80%. In fact, vinylidene content of at least about 90% may be easily achieved through the use of the teachings of the '913 patent.

As set forth in the '913 patent, the complexing agent used to complex with the $BF_3$ catalyst may desirably be an alcohol, and preferably may be a primary alcohol. More preferably the complexing agent may comprise a $C_1$-$C_8$ primary alcohol and ideally may be methanol.

To achieve the most desired results in accordance with the teachings of the '913 patent, the molar ratio of $BF_3$ to complexing agent in the complex may range from approximately 0.5:1 to approximately 5:1. Preferably the molar ratio of $BF_3$ to complexing agent in the complex may range from approximately 0.5:1 to approximately 2:1. Even more preferably the molar ratio of $BF_3$ to complexing agent in the complex may range from approximately 0.5:1 to approximately 1:1, and ideally, the molar ratio of $BF_3$ to complexing agent in the complex may be approximately 1:1.

In further accord with the teachings of the '913 patent, it is preferred that from about 0.1 to about 10 millimoles of $BF_3$ may be introduced into the reaction admixture with the catalyst composition for each mole of isobutylene introduced into the admixture in the feedstock. Even more preferably, from about 0.5 to about 2 millimoles of $BF_3$ may be introduced into the reaction admixture with said catalyst composition for each mole of isobutylene introduced into the admixture in the feedstock.

When the teachings of the '913 patent are applied, a process is provided whereby the polydispersity of the produced polyisobutylene may be no more than about 2.0, and desirably may be no more than about 1.65. Ideally, the polydispersity may be in the range of from about 1.3 to about 1.5.

In accordance with one preferred embodiment taught in the '913 patent, the reaction zone may comprise a loop reactor wherein the reaction admixture is continuously recirculated at a first volumetric flow rate, and the feedstock and the catalyst composition may be continuously introduced at a combined second volumetric flow rate. The ratio of the first volumetric flow rate to the second volumetric flow rate may desirably range from about 20:1 to about 50:1, may preferably range from about 25:1 to about 40:1 and ideally may range from about 28:1 to about 35:1. In order to achieve the preferred benefits of the loop reactor, the ratio of the first volumetric flow rate to the second volumetric flow rate may preferably be such that the concentrations of ingredients in the reaction admixture remain essentially constant and/or such that essentially isothermal conditions are established and maintained in the reaction admixture.

As described in the '913 patent, the feedstock and the catalyst composition may be premixed and introduced into the reaction zone together as a single stream at the second volumetric flow rate. Alternatively, the feedstock and the catalyst composition may be introduced into the reaction zone separately as two respective streams, the flow rates of which together add up to the second volumetric flow rate.

To achieve the ideal results described in the '913 patent, the reactor configuration, the properties of the reaction mixture, and the first volumetric flow rate may be such that turbulent flow is maintained in the reaction zone. In particular, the system may be such that a Reynolds number (Re) of at least about 2000 is achieved and maintained in the reaction zone. The system may also be such that a heat transfer coefficient (U) of at least about 50 Btu/min $ft^2$ EF. is achieved and maintained in the reaction zone. To this end, the reactor may desirably be the tube side of a shell-and-tube heat exchanger.

In further accordance with the concepts and principles of the novel process described in the '913 patent, the feed stock may generally comprise at least about 30% by weight of isobutylene, with the remainder being non-reactive hydrocarbon diluents.

As mentioned above, high vinylidene PIB contains only a single double bond in each molecule, and most of these are in the terminal (alpha) position. Typically, more than 70%, and preferentially more than 80%, of the double bonds are in the terminal (alpha) position. Generally speaking, in known high vinylidene PIB products, the remaining 20 to 30% of the double bonds are in the beta position (between the second and third carbon atoms of the polymeric backbone). These beta position double bonds may be either 1,1,2-trisubstituted or 1,2,2-trisubstituted. Almost no tetra-substituted isomers are present in the high vinylidene PIB made in accordance with the teachings of the '913 patent, so that the total of the alpha and beta isomers is essentially about 100%.

On the other hand, while regular (conventional) PIB also has only one double bond per molecule, only about 5-10% of those double bonds are in the alpha position and only about 50% are in a beta position. The remainder of the PIB isomers include double bonds that are tetra-substituted and internal to the polymer as a result of isomerization reactions which occur during preparation. Because of the high level of the relatively non-reactive tetra-substituted olefin content, these products are sometimes referred to as low reactive PIB.

In the past, the only known PIB compositions have been (1) the highly reactive PIB containing essentially 100% alpha plus beta olefin isomers, with the vinylidene (alpha) isomer content being greater than 70%, and (2) the low reactive PIB in which the alpha plus beta isomer content is only about 60% and the vinylidene (alpha) content is less than about 10%.

SUMMARY OF THE INVENTION

The present invention provides a new, relatively low molecular weight, mid-range vinylidene content PIB polymer product and a process for making the same. The alpha (vinylidene) position PIB isomers plus the beta position PIB isomers present in the mid-range vinylidene content PIB polymer product preferably comprise at least about 90% of the total molecules present in the product. Desirably, the alpha plus beta isomers may comprise at least about 95% of the total molecules present in the product, and ideally the alpha plus beta isomers, may comprise essentially 100% of the total molecules present in the product. Generally, in accordance with the concepts and principles of the invention, the vinylidene (alpha) isomer content of the product may be less than 70% thereof and may be as low as 20%. Conversely, the beta isomer content may range from about 30% to about 80% of the total molecules present in the product. In a mid-range vinylidene content PIB composition of the invention, the content of tetra-substituted internal double bonds is desirably very low, advantageously no more than about 10%, preferably less than about 5% and ideally less than about 1-2% of the double bonds. The advantage of these products is that the overall reactivity thereof, for some applications, is still very high without the need for high vinylidene content.

DETAILED DESCRIPTION OF THE PREFERRED EMBODIMENTS

Figure 1:
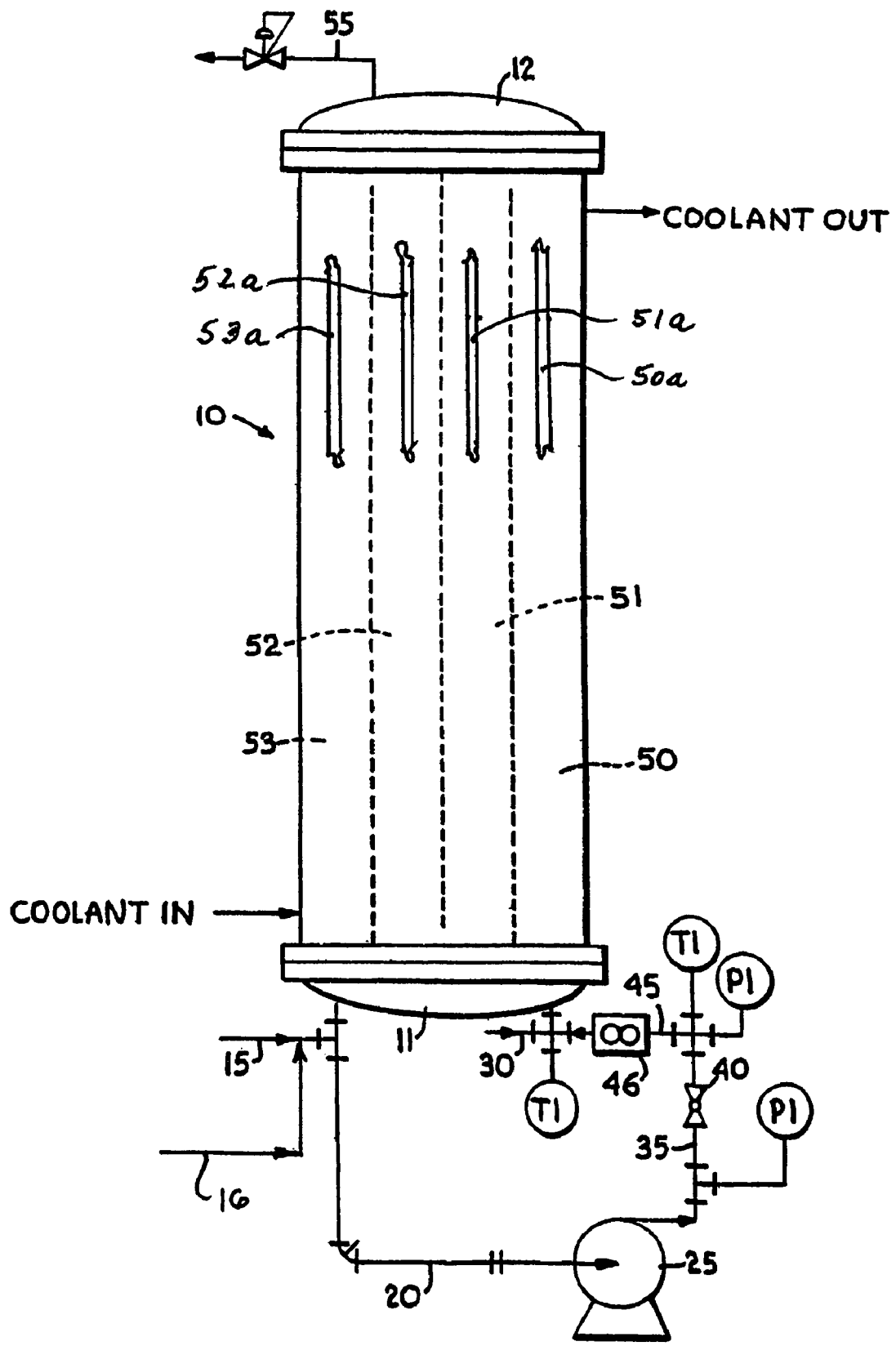
FIG. 1 is a schematic illustration of a reactor in the form of a quadruple pass shell and tube heat exchanger which is useful for carrying out the improved process and producing the improved mid-range vinylidene of the invention.

As mentioned above, new methodology for preparing high vinylidene PIB polymers (>70% alpha position double bonds) is described in the '913 patent, the entirety of the disclosure of which is incorporated herein by reference. It has now been found, that in accordance with the concepts and principles of the present invention, the process variables described in the '913 patent may be manipulated and/or adjusted so as to provide the conditions needed for producing a mid-range vinylidene content PIB composition. In preparing the desired mid-range content vinylidene PIB of the invention, wherein the vinylidene (alpha position double bond) isomer content may be in the range of from about 20% to about 70%, the process variables of the process disclosed in the '913 patent may be manipulated as follows:

(1) a catalyst complexing agent (preferably methanol) to $BF_3$ ratio of 1.3:1 or less in the catalyst complex is desirably employed resulting in reduced catalyst consumption because there is a greater amount of $BF_3$ and a correspondingly lesser amount of catalyst complexing agent in the catalyst complex;

(2) for any given $M_N$, a higher reaction temperature may be employed. For an $M_N$ of about 1050 or so, the temperature may desirably roughly correspond to about 90 EF, whereas a typical reaction temperature of 60 EF or so is desirable for producing high vinylidene products;

(3) the reaction time may desirably be kept to a minimum, preferably less than 4 minutes, and ideally less than one minute; and (4) the $BF_3$ to isobutylene feedstock ratio, reactor configuration, residence time, catalyst concentration, Reynolds number, U factor, volumetric flow rate range, feedstock concentration, and $M_N$ range may desirably be essentially the same as disclosed in the '913 patent.

The polydispersity of the resulting mid-range vinylidene content PIB product produced as described above will tend to be narrower than the polydispersity of the highly reactive PIB produced in accordance with the process of the '913 patent because of lower catalyst consumption. Moreover, when the mid-range vinylidene content PIB product is prepared using the conditions described above, the total amount of beta olefin isomers (1,1,2-trisubstituted or 1,2,2-trisubstituted) present in the resultant PIB polymer composition plus the amount of alpha isomers present in the resultant PIB polymer composition add up to almost 100% of the composition.

The mid-range vinylidene content PIB products produced employing the concepts and principles of the present invention may generally be used in place of the highly reactive PIB products described in the '913 patent in many end-use applications. Although reaction speeds may be slightly to moderately lower than when the high vinylidene products are used, overall conversion rates are similar because the mid-range vinylidene content PIB polymer composition comprises essentially 100% alpha olefin isomers plus beta olefin isomers, whereby the presence of internal double bond isomers is minimized.

It has been observed that the mid-range vinylidene content PIB olefin compositions of the present invention are efficiently reactive in end-use applications such as PIB alkylation onto aromatic rings, particularly phenolic compounds, as well as PIB amine derivatives and PIB-maleic anhydride reaction products. Tetra-substituted internal double bonds are not reactive in the formation of the above mentioned PIB derivatives, whereas beta position double bonds are.

Desirably the tetra-substituted internal double bond isomer content of the mid-range vinylidene content PIB products of the invention should generally be very low, typically no more than about 1-2%, so as to optimize the performance of the product. However, it should be noted that the amount of tetra-substituted internal double bond isomer that may be tolerated in a valuable commercial product may be as much as 5% or more.

As set forth above, the present invention provides an improved liquid phase process for the efficient and economical production of mid-range vinylidene content PIB products. The invention also provides novel mid-range vinylidene content PIB products. In accordance with the invention, an isobutylene containing feedstock stream is contacted in a reaction zone with a catalyst which facilitates the polymerization reaction. Appropriate reaction conditions as described above are provided in the reaction zone. After an appropriate residence time, a PIB containing product stream is withdrawn from the reaction zone. With the foregoing in mind, the present invention provides an improved PIB producing process which may be easily controlled and manipulated as described above to efficiently and economically provide a relatively low molecular weight, mid-range vinylidene content PIB product.

The improved process of the present invention features the use of a $BF_3$ catalyst which desirably may be complexed with a complexing agent that appropriately alters the performance of the catalyst. Many other potentially useful catalysts are known to those of ordinary skill in the related art field. In particular, many useful catalysts are described in the prior patents referenced above. The complexing agent for the catalyst, and in particular for the $BF_3$ catalyst, may be any compound containing a lone pair of electrons, such as, for example, an alcohol, an ester or an amine. For purposes of the present invention, however, the complexing agent may preferably be an alcohol, desirably a primary alcohol, even more desirably a $C_1$-$C_8$ primary alcohol and ideally methanol.

As discussed above, for the purposes of the present invention, the molar ratio of complexing agent to $BF_3$ in the catalyst composition should generally be about 1.3:1 or less, for example, 1.2:1 or less, 1.1:1 or less, 1:1 or less, and in fact, the catalyst composition may consist of essentially uncomplexed $BF_3$ for some particularized applications. In determining the ratio, important considerations include avoidance of free $BF_3$ in the reactor and minimization of tetra substituted internal double bond isomers in the product. The temperature in the reaction zone may generally and preferably be greater than 60 EF., and ideally may be about 90 EF., although temperatures as low as 0 EF may be suitable where a high molecular weight product is desired. The reactor residence time may generally and preferably be less than 4 minutes and ideally may be less than one minute. With these parameters, it is possible to operate the process so as to achieve efficiencies, economies and relatively low molecular weight, mid-range vinylidene content PIB products not previously thought to be available. In accordance with the present invention, the catalyst concentration and the $BF_3$/complexing agent ratio may be manipulated as required to achieve the desired relatively low molecular weight, mid-range vinylidene content PIB products, usually with a reaction temperature greater than 60 EF. and a reactor residence time of less than 4 minutes. Generally speaking, the amount of the $BF_3$ catalyst introduced into the reaction zone should be within the range of from about 0.1 to about 10 millimoles for each mole of isobutylene introduced into the reaction zone. Preferably, the $BF_3$ catalyst may be introduced at a rate of about 0.5 to about 2 millimoles per mole of isobutylene introduced in the feedstock.

The process itself includes steps resulting in the intimate mixing of the isobutylene containing reactant stream and the catalyst complex and/or removal of heat during the reaction. The intimate mixing may desirably be accomplished by turbulent flow. Turbulent flow also enhances heat removal. These conditions separately or together permit the higher operating temperatures (e.g. 60 EF.) and the shorter reactor residence times (e.g. 4 minutes) desired to produce the relatively low molecular weight, mid-range vinylidene content PIB products of the invention. These important parameters may be achieved by causing the catalyzed reaction to take place in the tubes of a shell-and-tube heat exchanger at a flow rate which results in turbulent flow.

Many potentially valuable reactors are well known to the routineers in the art to which the invention pertains. However, for purposes of one preferred embodiment of the invention, the reactor may be a four-pass shell-and-tube heat exchanger as shown in FIG. 1 where it is identified by the numeral 10. The reactor may, for example, have 80⅜-inch tubes with a wall thickness of 0.022 inch, each thereby providing an internal tube diameter of 0.331 inch. The reactor may be three feet long and may have internal baffling and partitions to provide 4 passes with 20 tubes per pass. Such construction is well known in the heat exchanger and reactor arts and no further explanation is believed necessary.

In operation, the isobutylene containing feedstock enters the reactor system through pipe 15 which is preferably located adjacent the bottom head 11 of reactor 10. Pipe 15 directs the feed stock into the suction line 20 of a recirculation pump 25. The catalyst complex may be injected into the reactor circulation system through pipe 30 located adjacent bottom head 11 of reactor 10. It should be noted here, that in accordance with the principles and concepts of the invention, the catalyst complex could just as well be injected separately into the reactor, in which case a separate catalyst pump may be required.

A catalyst modifier may be added to the feedstock via pipe 16 before the feedstock enters the reactor system. The desirable purpose of the modifier is to assist in controlling the vinylidene content of the PIB product. The catalyst modifier may potentially be any compound containing a lone pair of electrons such as an alcohol, an ester or an amine. However, it is pointed out in this regard that if the amount of modifier is too great, the same may actually kill the catalyst. The feedstock containing the modifier enters the reactor system at the suction line 20 of the circulation pump 25. The catalyst complex composition enters the reactor system via line 30 at a location downstream from pump 25 and adjacent the first pass as shown in FIG. 1. The catalyst complex is preferably a methanol/$BF_3$ complex with a molar ratio of methanol to $BF_3$ of about 1.3:1 or less. The amount of modifier added via line 16 may vary from 0 to about 1 mole for each mole of $BF_3$ added as a complex via line 30.

Circulation pump 25 pushes the reaction mixture through line 35, control valve 40 and line 45 into the bottom head 11 of the reactor 10. A flow meter 46 may be positioned in line 45 as shown. The reaction mixture travels upwardly through pass 50, downwardly through pass 51, upwardly through pass 52 and downwardly through pass 53. As explained previously, each pass 50, 51, 52 and 53 may preferably include 20 separate tubes. For clarity, only a portion of respective single tube is illustrated schematically in each pass in FIG. 1. These tubes are identified by the reference numerals 50a, 51a, 52a and 53a. However, as discussed above, each pass will consist of a plurality, for example 20, of these individual tubes, each of which extend between top head 11 and bottom head 12 and are in fluid communication the fluids in heads 11 and 12.

It is to be noted here, that the reaction mixture should preferably be circulated through the tubes 50a, 51a, 52a, 53a of the reactor at a flow rate sufficient to obtain turbulent flow, whereby to achieve intimate intermixing between the catalyst complex and the reactants and a heat transfer coefficient appropriate to provide proper cooling. In this regard, the flow rate, the reaction mixture properties, the reaction conditions and the reactor configuration should be appropriate to produce a Reynolds number (Re) in the range of from about 2000 to about 3000 and a heat transfer coefficient (U) in the range of from about 50 to about 150 Btu/min ft² EF in the tubes of the reactor. Such parameters may generally be obtained when the linear flow rate of a typical reaction mixture through a tube having an internal diameter of 0.331 inch is within the range of from about 6 to 9 feet per second.

The circulating reaction mixture leaves reactor 10 via suction line 20. The circulating reaction mixture is preferably maintained at steady state equilibrium conditions so that the reactor, in essence, is a Continuous Stirred Tank Reactor (CSTR). The reactor may also be of the type which is sometimes referred to as a loop reactor. With this system, which is only a preferred system since there are many other arrangements which would be apparent to those of ordinary skill in the art, the flow rate of the reactant mixture in the reactor may be adjusted and optimized independently of feed stock introduction and product removal rates so as to achieve thorough intermixing of the catalyst complex and the reactants and appropriate temperature control.

A product exit line 55 may preferably be provided in top head 12 at a point which is approximately adjacent the transition zone between the third and fourth passes. Such positioning may be desirable to avoid any potential for loss of unreacted isobutylene. Moreover, the positioning of the exit line 55 should be appropriate to facilitate bleeding of gas from the reactor during startup. A coolant may desirably be circulated on the shell side of the reactor at a rate to remove heat of reaction and maintain the desired temperature in the reactor.

The product exiting the system via line 55 should be quenched immediately with a material capable of killing the catalyst, such as, for example, ammonium hydroxide. Thus, any potential rearrangement of the polymer molecule which would shift the double bond away from the desired terminal and beta positions is minimized. The relatively low molecular weight, mid-range vinylidene content PIB products of the invention may then be directed to a work up system (not shown) where catalyst salts may be removed and the PIB product separated from unreacted isobutylene and other undesirable contaminants such as diluents, etc. These latter materials may then be recycled or diverted for other uses employing known methodology.

With the described recirculation system, the rate of feedstock introduction into the reaction mixture and the rate of product removal are each independent of the circulation rate. As will be appreciated by those of ordinary skill in the art, the number of passes through the reactor and the size and configuration of the latter are simply matters of choice. The feedstock and product withdrawal flow rates may preferably be chosen such that the residence time of the reaction mixture within the reactor is 4 minutes or less, desirably 3 minutes or less, preferably 2 minutes or less, even more preferably 1 minute or less, and ideally less than 1 minute. From a commercial operating viewpoint, the flow rate should be such that the residence time of the reaction mixture in the reactor is within the range of from about 45 to about 90 seconds. In connection with the foregoing, the residence time is defined as the total reactor system volume divided by the volumetric flow rate.

The recirculation flow rate, that is the flow rate of the reaction mixture in the system induced by the recirculation pump 25, is controlled, as described above, to achieve appropriate turbulence and/or heat transfer characteristics. This recirculation flow rate is often a function of the system itself and other desired process conditions. For the system described above, the ratio of the recirculation flow rate to the incoming feedstock flow rate (recycle ratio) should generally be maintained in the range of from about 20:1 to about 50:1, desirably in the range of from about 25:1 to about 40:1, and ideally in the range of from about 28:1 to about 35:1. In particular, in addition to causing turbulence and providing an appropriate heat transfer coefficient, the recirculation flow rate of the reaction mixture should be sufficient to keep the concentrations of the ingredients therein essentially constant and/or to minimize temperature gradients within the circulating reaction mixture whereby essentially isothermal conditions are established and maintained in the reactor.

As mentioned above, the recycle ratios generally should be in the range of from about 20:1 to about 50:1. Higher recycle ratios increase the degree of mixing and the reactor approaches isothermal operation leading to narrower polymer distributions. Lower recycle ratios decrease the amount of mixing in the reactor, and as a result, there is a greater discrepancy in the temperature profiles. As the recycle ratio approaches zero, the design equations for the reactor reduce to those for a plug flow reactor model. On the other hand, as the recycle ratio approaches infinity, the modeling equations reduce to those for a CSTR. When CSTR conditions are achieved, both temperature and composition remain constant and the composition of the product stream leaving the reactor is identical to the composition of the reaction mixture recirculating in the reactor.

Needless to say, after equilibrium has been established, as feedstock enters the system, an equal volume of product is pushed out of the reactor loop. Under CSTR conditions, the point at which the product stream is withdrawn is independent of reactor geometry. However, the top of the third pass was chosen so any air or non-condensable species in the reactor at start-up may conveniently be purged. Also, it is preferred that the withdrawal point be as far as possible from the point where fresh feedstock is introduced into the system just to make sure that conditions within the reactor have achieved steady-state operation and are therefore as stable as possible The feedstock entering the system through line 15 may be any isobutylene containing stream such as, but not limited to, isobutylene concentrate, dehydro effluent, or a typical raff-1 stream. These materials are described respectively below in Tables 1, 2 and 3.

TABLE 1

Isobutylene Concentrate

| Ingredient | Weight % |
|---|---|
| $C_3$s | 0.00 |
| I-butane | 6.41 |
| n-butane | 1.68 |
| l-butene | 1.30 |
| I-butene | 89.19 |
| trans-2-butene | 0.83 |
| cis-2-butene | 0.38 |
| 1,3-butadiene | 0.21 |

TABLE 2

Dehydro Effluent

| Ingredient | Weight % |
|---|---|
| $C_3$s | 0.38 |
| I-butane | 43.07 |
| n-butane | 1.29 |
| l-butene | 0.81 |
| I-butene | 52.58 |
| trans-2-butene | 0.98 |
| cis-2-butene | 0.69 |
| 1,3-butadiene | 0.20 |

TABLE 3

Raff-1

| Ingredient | Weight % |
|---|---|
| $C_3$s | 0.57 |
| I-butane | 4.42 |
| n-butane | 16.15 |
| l-butene | 37.22 |
| I-butene | 30.01 |
| trans-2-butene | 8.38 |
| cis-2-butene | 2.27 |
| 1,3-butadiene | 0.37 |
| MTBE | 0.61 |

For commercial and process economies, the isobutylene content of the feedstock generally should be at least about 30 weight %, with the remainder comprising one or more non-reactive hydrocarbon, preferably alkane, diluents.

The desired product is a relatively low molecular weight, mid-range vinylidene content PIB product. Thus, the polyisobutylene leaving the reactor by way of line 55 should have an $M_N$ which is less than about 10,000. Generally speaking, the produced isobutylene should have an $M_N$ within the range of from about 500 to about 5000, desirably from about 600 to about 4000, preferably from about 700 to about 3000, even more preferably from about 800 to about 2000, and ideally from about 900 to about 1050. By carefully controlling the various parameters of the process, it is possible to produce a product wherein the $M_N$ is relatively consistent at some desired number, for example, 950 or 1000.

The polydispersity of the relatively low molecular weight, mid-range vinylidene content PIB product may also be important. The term polydispersity refers to the molecular weight distribution in a given polymer product and generally is defined as the ratio of the molecular weight of the highest molecular weight molecule to the molecular weight of the lowest molecular weight molecule. Polydispersity may be controlled by carefully maintaining constant monomer concentrations and isothermal conditions within the reaction mixture. Generally speaking, it is desirable that the polydispersity be as low as possible in order to diminish the content of unwanted relatively low or high molecular weight polyisobutylenes in the product and thus improve the quality of the latter. By following the concepts and principles of the present invention, it has been found that the polydispersity of the product may be controlled at no more than about 2.0. Preferably, through the use of the invention, a polydispersity of no more than about 1.65 may be achieved. Even more desirably, the polydispersity may be controlled so as to be within the range of from about 1.3 to about 1.5.

The relatively low molecular weight, mid-range vinylidene content PIB products obtained through the use of the present invention should generally have a terminal (vinylidene) unsaturation content less than about 70%. That is to say, less than about 70% of the double bonds remaining in the polymerized product should be in a terminal position. Desirably, the vinylidene content of the relatively low molecular weight, mid-range vinylidene content PIB product of the invention may be less than about 60%, less than about 50%, less than about 40%, less than about 30%, and perhaps even as low as 20%, depending upon the needs of the end use application. Conversely, the beta double bond content of the relatively low molecular weight, mid-range vinylidene content PIB product of the invention may desirably be greater than 30%, greater than 40%, greater than 50%, greater than 60%, greater than 70%, or even as high as 80%, again depending upon the needs of the end use application. It is to be recognized in this regard that the vinylidene content may be indirectly related to conversion rates. That is to say, the higher the conversion rate, the lower the vinylidene content. Moreover, vinylidene content is directly related in the same way to molecular weight. Accordingly, in each process a balance may be required between molecular weight, conversion rate, vinylidene content and beta double bond content.

EXAMPLE 1

Using the principles and concepts of the invention, a reactor such as the reactor illustrated in FIG. 1, may be used to produce the relatively low molecular weight, mid-range vinylidene content PIB product of the invention. The feedstock may be essentially the same as that shown above in Table 1, and the coolant circulated on the shell side of the reactor may be a mixture of 50 weight % methanol and 50 weight % water. The inlet coolant temperature may be about 32 EF. A 1:1.3 $BF_3$/methanol complex catalyst may be used to achieve the results set forth below in Table 4.

TABLE 4

| | |
|---|---|
| Feedstock flow rate | 1.25 gpm |
| Recirculation flow rate | 35 gpm |
| Feedstock density | 5 lb/gal |
| Reaction temperature | 60 EF. |
| Conversion | 35 wt % |
| Concentration of isobutylene in feedstock | 92 wt % |
| $\Delta H_{reaction}$ | 300 Btu/lb |
| μ reaction mixture | 4.0 centipoise = 0.0027 lb/ft sec |
| Cp of reaction mixture | 0.46 Btu/lb EF. |
| Reaction effective density | 44.9 lb/ft$^3$ |
| Thermal conductivity | 0.07 Btu/hr ft EF. |
| Total volume of reactor recirculation system | 390.2 in$^3$ |
| Residence time | 79.82 seconds |
| Linear velocity inside tubes | 6.52 ft/sec |
| Reynolds number | 2504.4 |
| Surface area of tubes | 23.5 ft$^2$ |
| Heat generated | 603.8 Btu/min |
| $\Delta T_{lm}$ | 66.5 EF. |
| Heat flux | 25.6 Btu/min ft$^2$ |
| U | 96.1 Btu/min ft$^2$ EF. |

EXAMPLE 2

Figure 2:
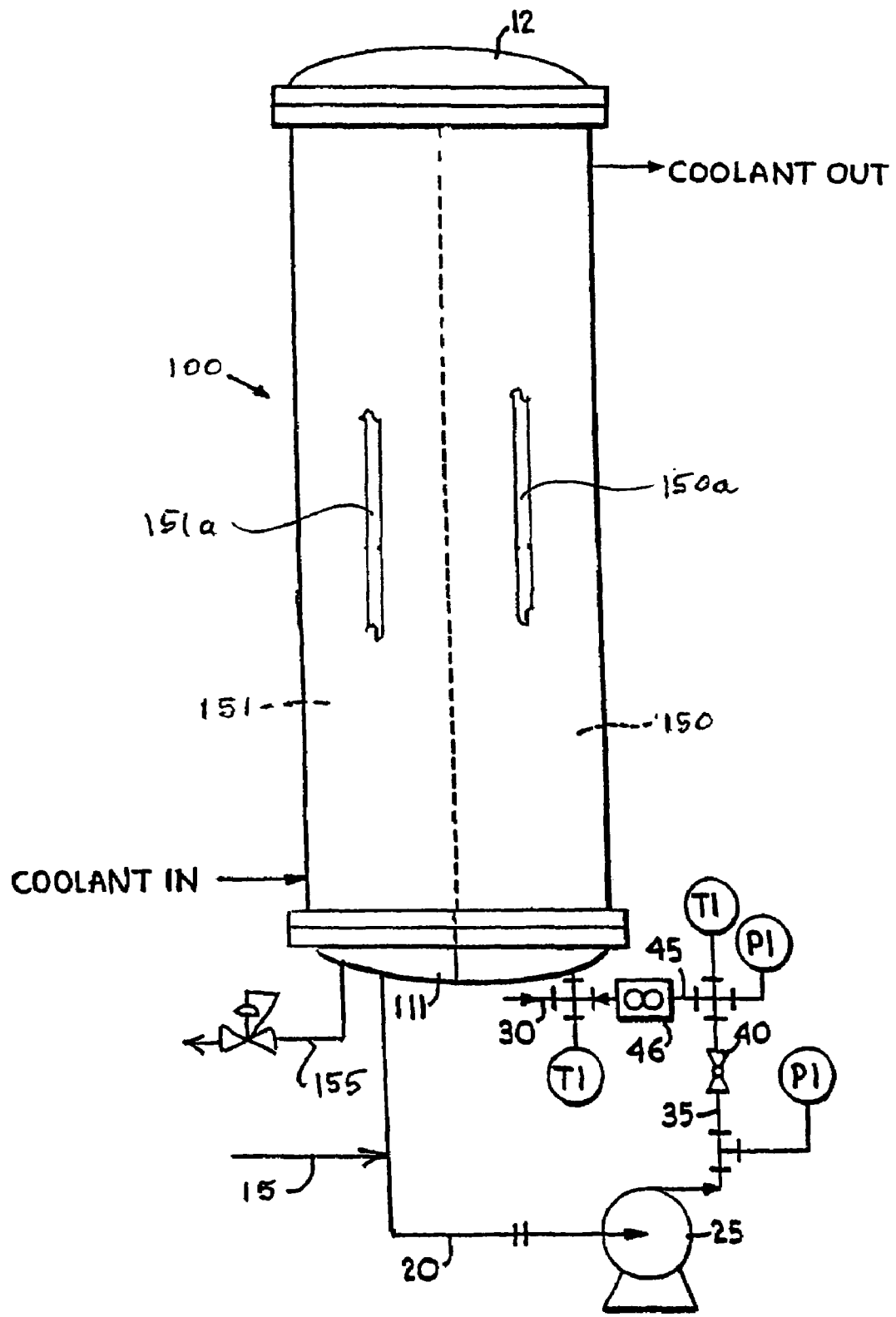
FIG. 2 is a schematic illustration of a reactor in the form of a double pass shell and tube heat exchanger which is useful for carrying out the improved process and producing the improved mid-range vinylidene of the invention.

Using the principles and concepts of the invention, a full scale reactor, such as the reactor 100 illustrated in FIG. 2, may also be used to produce the relatively low molecular weight, mid-range vinylidene content PIB product of the invention. In this case, the reactor 100 is a two-pass shell-and-tube heat exchanger. The reactor 100 may, for example, have 388 0.0375-inch tubes with a wall thickness of 0.035 inch, each thereby providing an internal tube diameter of 0.305 inch. The reactor 100 may be twelve feet long and may have internal baffling and partitions to provide 2 passes with 194 tubes each. The passes are identified by the reference numerals 150 and 151 in FIG. 2, and the 194 tubes of each pass are represented by the single tube portions 150a and 151a shown schematically in FIG. 2. Desirably, the product exit line 155 may be provided in the bottom head 111 of reactor 100. Other than the number of passes, the number of tubes per pass, and the position of the exit line 155, the reactor 100 of FIG. 2 operates in essentially the same manner as the reactor 10 of FIG. 1.

As in Example 1, the feedstock again may be essentially the same as shown above in Table 1, and the coolant circulated on the shell side of the reactor may be a mixture of 50 weight % methanol and 50 weight % water. The inlet coolant temperature may be about 32 EF. A 1:1.3 $BF_3$/methanol complex catalyst may be used to achieve the results set forth below in Table 5.

TABLE 5

| | |
|---|---|
| Feedstock flow rate | 22 gpm |
| Recirculation flow rate | 300 gpm |
| Feedstock density | 5 lb/gal |
| Reaction temperature | 60 EF. |
| Conversion | 70 wt % |
| Concentration of isobutylene in feedstock | 89 wt % |
| $\Delta H_{reaction}$ | 300 Btu/lb |
| μ reaction mixture | 4.0 centipoise = 0.0027 lb/ft sec |
| Cp of reaction mixture | 0.46 Btu/lb EF. |
| Reaction effective density | 44.9 lb/ft$^3$ |
| Thermal conductivity | 0.07 Btu/hr ft EF. |
| Total volume of reactor recirculation system | 7794.9 in$^3$ |
| Residence time | 92.03 seconds |
| Linear velocity inside tubes | 6.79 ft/sec |
| Reynolds number | 2401.7 |
| Surface area of tubes | 457.1 ft$^2$ |
| Heat generated | 20559.0 Btu/min |
| $\Delta T_{lm}$ | 26 EF. |
| Heat flux | 45 Btu/min ft$^2$ |
| U | 104.3 Btu/min ft$^2$ EF. |
| Cp coolant | 0.86 Btu/lb EF. |
| Density coolant | 7.70 lb/gal |
| Coolant flow rate | 412.0 gpm |
| $\Delta T$ coolant | 8.0 EF |

The composition of the product thus obtained is set forth below in Table 6.

TABLE 6

Crude Polyisobutylene Product

| Ingredient | Weight % |
|---|---|
| $C_4$ | 31.5 |
| $C_8$ | 0.07 |
| $C_{12}$ | 0.7 |
| $C_{16}$ | 0.9 |
| $C_{20}$ | 0.7 |
| $C_{24}$ | 0.3 |
| polyisobutylene (PIB) | 56.19 |

As mentioned above, the $M_N$ of the product generally varies inversely with the temperature of the reaction. That is to say, higher temperatures generally result in products having a lower $M_N$. To illustrate this phenomena, the reaction temperature in reactor 100 was varied while holding other variables constant with the results set forth below in Table 7.

TABLE 7

Crude Polymer Composition
(including isobutane and unreacted isobutylene)

| Molecular Weight | Reaction Temp. (° F.) | Crude PIB Composition (wt %) | | | | | | |
|---|---|---|---|---|---|---|---|---|
| | | C4 | C8 | C12 | C16 | C20 | C24 | PIB |
| 350 | 83 | 19.9 | 5.0 | 16.2 | 11.6 | 5.2 | 1.6 | 40.6 |
| 550 | 75 | 24.4 | 0.4 | 6.2 | 6.4 | 3.5 | 1.6 | 57.5 |
| 750 | 72 | 27.9 | 0.2 | 2.8 | 3.2 | 2.0 | 0.9 | 63.1 |
| 950 | 60 | 31.5 | 0.07 | 0.7 | 0.9 | 0.7 | 0.3 | 65.9 |
| 2300 | 20 | 64.4 | 0.004 | 0.08 | 0.1 | 0.1 | 0.04 | 35.3 |

We claim:

1. A mid-range vinylidene content PIB polymer composition comprising PIB molecules, wherein a first portion of said PIB molecules have alpha position double bonds and a second portion of said PIB molecules have beta position double bonds, wherein said first and second portions together include at least 90% of the PIB molecules of the composition, wherein no more than about 10% of the PIB molecules of the composition have tetra-substituted internal double bonds, wherein said first portion comprises less than 70% of the PIB molecules of the composition, and wherein said composition has a polydispersity of no more than 2.0, said PIB polymer composition characterized by having been prepared by a process comprising:

providing a liquid feedstock comprising isobutylene;
   providing a catalyst composition comprising a stable complex of $BF_3$ and a catalyst complexing agent, wherein the ratio of complexing agent to $BF_3$ in said complex is no more than about 1.3:1;
   introducing said feedstock and said catalyst composition into a residual reaction mixture in a loop reactor reaction zone;
   recirculating the residual reaction mixture in said zone at a recirculation rate sufficient to cause intimate intermixing of the residual reaction mixture, the feedstock and the catalyst composition to thereby present a recirculating, intimately intermixed reaction admixture in said reaction zone;
   maintaining the recirculating intimately intermixed reaction admixture in its intimately intermixed condition and removing heat of reaction from the reaction admixture at a rate calculated to provide a substantially constant reaction temperature in the reaction admixture while the same is recirculating in said reaction zone;
   withdrawing a product stream comprising said mid-range vinylidene content PIB polymer composition; and
   controlling the introduction of said feedstock into said reaction zone and the withdrawal of said product stream from the reaction zone such that the residence time of the isobutylene components undergoing polymerization in the reaction zone is no more than about 4 minutes.

2. A mid-range vinylidene content PIB polymer composition as set forth in claim 1, wherein said reaction temperature is at least about 60° F., and wherein said agent is methanol.

3. A mid-range vinylidene content PIB polymer composition as set forth in claim 1, wherein the ratio of complexing agent to BF3 in said complex is about 1:1.

4. A mid-range vinylidene content PIB polymer composition having an alpha position double bond content that is less than 70% of the total double bond content of the composition and a polydispersity of no more than 2.0, said composition characterized by having been produced by a process comprising:

providing a feedstock comprising isobutylene;
   providing a catalyst composition comprising a complex of $BF_3$ and a complexing agent therefor;
   introducing said feedstock and said catalyst composition into a residual reaction mixture in a reaction zone;
   intimately intermixing said residual reaction mixture, said feedstock and said catalyst composition to present an intimately intermixed reaction admixture in said reaction zone;
   maintaining the intimately intermixed reaction admixture in its intimately intermixed condition and keeping it at a temperature of at least about 0° C. while the same is in said reaction zone, to thereby cause the isobutylene therein to undergo polymerization to form said polyisobutylene;
   manipulating the ratio of $BF_3$ to complexing agent in the catalyst composition so as to adjust the vinylidene content of the PIB polymer composition;
   withdrawing a product stream comprising polyisobutylene having an alpha plus beta isomer content of at least about 90% from said reaction zone; and
   controlling the introduction of said feedstock into said reaction zone and the withdrawal of said product stream from the reaction zone such that the residence time of the isobutylene undergoing polymerization in the reaction zone is no greater than about 4 minutes.

* * * * *